(12) United States Patent
Wang

(10) Patent No.: US 12,140,170 B2
(45) Date of Patent: Nov. 12, 2024

(54) POSITION-LIMITING DEVICE

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 1520 days.

(21) Appl. No.: 16/429,109

(22) Filed: Jun. 3, 2019

(65) Prior Publication Data
US 2019/0376537 A1    Dec. 12, 2019

(30) Foreign Application Priority Data
Jun. 6, 2018  (TW) .................................. 107207581

(51) Int. Cl.
| | | |
|---|---|---|
| F16B 21/02 | (2006.01) | |
| F16B 1/00 | (2006.01) | |
| F16B 2/18 | (2006.01) | |
| F16D 13/75 | (2006.01) | |
| F16B 5/06 | (2006.01) | |
| F16D 11/00 | (2006.01) | |

(52) U.S. Cl.
CPC ................. *F16B 21/02* (2013.01); *F16B 1/00* (2013.01); *F16B 2/18* (2013.01); *F16D 13/757* (2013.01); *F16B 5/0642* (2013.01); *F16D 2011/006* (2013.01)

(58) Field of Classification Search
CPC .... F16B 21/02; F16B 1/00; F16B 2/18; F16B 5/0642
See application file for complete search history.

(56) References Cited

U.S. PATENT DOCUMENTS

| 3,709,088 | A | 1/1973 | Pitzer | |
|---|---|---|---|---|
| 10,294,971 | B2 * | 5/2019 | Wu | ..................... F16B 5/0635 |
| 2016/0003271 | A1 * | 1/2016 | Wang | ................... F16B 17/006 |
| | | | | 403/322.4 |
| 2017/0074303 | A1 * | 3/2017 | Bowers | ..................... F16B 5/10 |
| 2018/0202481 | A1 * | 7/2018 | Wu | ........................ F16B 21/02 |

FOREIGN PATENT DOCUMENTS

TW    M476198 U    4/2014

* cited by examiner

*Primary Examiner* — Daniel J Wiley
(74) *Attorney, Agent, or Firm* — Schmeiser, Olsen & Watts LLP

(57) ABSTRACT

A position-limiting device includes a position-limiting element and a body. The position-limiting element has a position-limiting portion and a blocking portion. The body has a corresponding blocking portion and a fitting portion. The blocking portion of the position-limiting element and the corresponding blocking portion of the body block each other such that the position-limiting element and the body are fitted together. The fitting portion is fitted to an object. The position-limiting element penetrates a position-limited component before being rotated to block or position-limit the position-limited component. Therefore, the body is fitted to the object, and the position-limiting element is rotated to position-limit or move away from the position-limited component, so as to couple together and separate the object and the position-limited component, thereby allowing two objects to be coupled together and separated repeatedly and rapidly.

17 Claims, 20 Drawing Sheets

POSITION-LIMITING DEVICE

CROSS-REFERENCE TO RELATED APPLICATION

This non-provisional application claims priority under 35 U.S.C. § 119(a) on Patent Application No(s). 107207581 filed in Taiwan, R.O.C. on Jun. 6, 2018, the entire contents of which are hereby incorporated by reference.

BACKGROUND OF THE INVENTION

1. Field of the Invention

The present disclosure relates to position-limiting devices, and in particular to a position-limiting device capable of coupling together and separating two objects repeatedly and rapidly.

2. Description of the Related Art

Prior art about fitting two objects together usually involves fixing the two objects to each other in an inseparable manner with screws, so as to couple the two objects together firmly and minimize the likelihood of their separation.

Although the prior art is effective in fixing and coupling together the two objects in an inseparable manner, it has the following drawbacks: difficult to put together the two objects; and difficult to demount the two objects because of the screws.

Therefore, it is imperative to provide a position-limiting device capable of coupling together and separating at least two objects repeatedly and rapidly.

BRIEF SUMMARY OF THE INVENTION

An objective of the present disclosure is to provide a position-limiting device for coupling a body to an object and rotating a position-limiting element such that it position-limits or moves away from a position-limited component to therefore couple together and separate the object and the position-limited component, thereby allowing the position-limiting device to be capable of coupling together and separating two objects repeatedly and rapidly.

To achieve at least the above objective, the present disclosure provides a position-limiting device, comprising: a position-limiting element and a body; the position-limiting element has a position-limiting portion and a blocking portion; the body has a corresponding blocking portion and a fitting portion; the blocking portion of the position-limiting element and the corresponding blocking portion of the body block each other such that the position-limiting element and the body are fitted together; the fitting portion is fitted to an object; the position-limiting element penetrates a position-limited component before being rotated to block or position-limit the position-limited component.

Regarding the position-limiting device, the position-limited component further comprises a position-limiting opening portion and a body opening portion, the body opening portion position-limits the non-axial or lateral movement of the body, and the position-limiting portion penetrates the position-limiting opening portion before being rotated to restrict axial movement of the position-limited component.

Regarding the position-limiting device, the body opening portion is of a larger size than, of a smaller size than or of the same size as the position-limiting opening portion.

Regarding the position-limiting device, the position-limiting portion has at least a restricting portion, and the position-limited component has at least a corresponding restricting portion, allowing the restricting portion and the corresponding restricting portion to interfere with each other or position-limit each other when the position-limiting portion undergoes rotation and position limitation.

Regarding the position-limiting device, when rotated, the restricting portion generates an opposing force and thereby blocks a surface of the position-limited component, whereas, when the position-limiting portion is rotated to reach the corresponding restricting portion, the restricting portion moves to engage with the corresponding restricting portion so as to laterally or non-axially block the position-limited component.

Regarding the position-limiting device, the restricting portion or the corresponding restricting portion is a convex portion, concave portion, slot portion, hole portion, plane portion, engaging portion, arcuate surface portion, curved surface portion or step portion.

Regarding the position-limiting device, the position-limiting element has at least a control portion conducive to manual operation or tool control.

Regarding the position-limiting device, the position-limiting element has a joint portion, and the joint portion is fitted to the position-limiting portion or the blocking portion.

The position-limiting device further comprises a resilient component or a friction-enhancing component, the resilient component having two ends abutting against the position-limiting element and the body, respectively, to provide the position-limiting element with resilience or damping force, friction enhancement, automatic restoring force or automatic reciprocating bouncing force.

Regarding the position-limiting device, the fitting portion has a material engaging portion for engaging with the object.

Regarding the position-limiting device, the fitting portion presses against the object such that part of the material of the object enters or flows into the material engaging portion.

Regarding the position-limiting device, the fitting portion is compressed by a die and thereby deformed to therefore engage with the object.

Regarding the position-limiting device, the body has a step portion, and the position-limited component is position-limited between the step portion and the position-limiting portion.

Regarding the position-limiting device, the position-limiting opening portion is a slot, hole, oblong hole or notch.

Regarding the position-limiting device, the position-limiting element is a strip, block, sheet, lever, or resilient leaf spring.

Regarding the position-limiting device, the blocking portion and the corresponding blocking portion are fitted to each other by riveting, fastening, expanding, welding or engaging.

Regarding the position-limiting device, the resilient component or the friction-enhancing component is a spring, helical spring, washer, leaf spring or sheet.

Therefore, with the position-limiting device of the present invention, a user fits a body on an object, rotates a position-limiting element such that it position-limits or moves away from a position-limited component to couple together or separate the object and the position-limited component, thereby allowing two objects to be coupled together and separated repeatedly and rapidly.

DETAILED DESCRIPTION OF THE INVETION

To facilitate understanding of the object, characteristics and effects of this present disclosure, embodiments together with the attached drawings for the detailed description of the present disclosure are provided.

Figure 1:
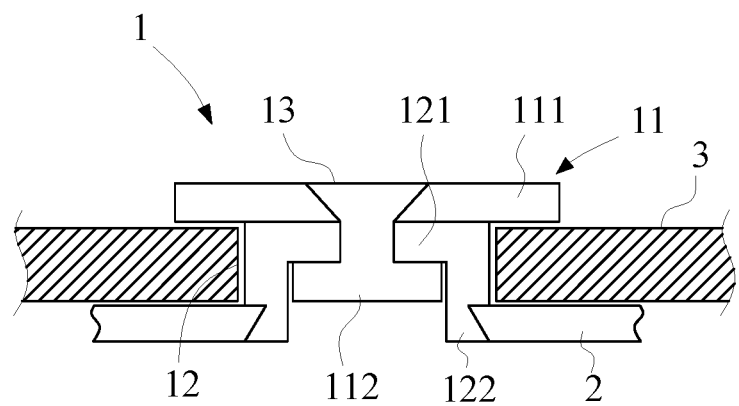
FIG. 1 is a cross-sectional view of a position-limiting device according to the first embodiment of the present disclosure.
Figure 2:
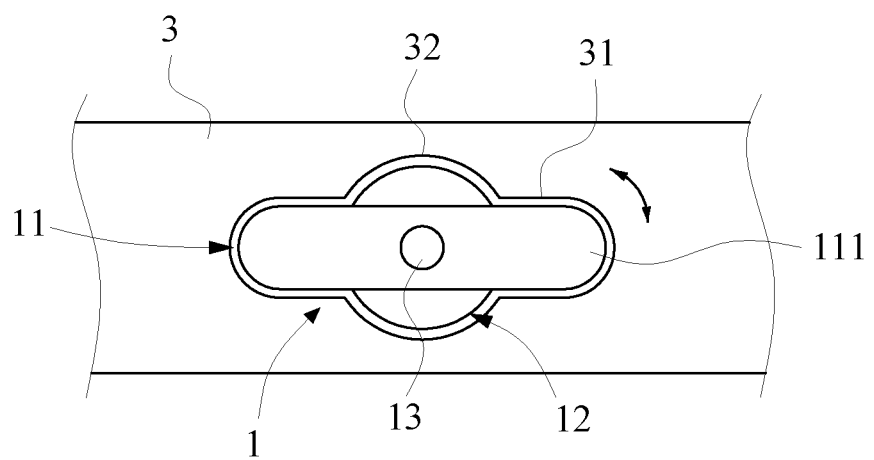
FIG. 2 is a first schematic view of the position-limiting device according to the first embodiment of the present disclosure, showing its operation.
Figure 3:
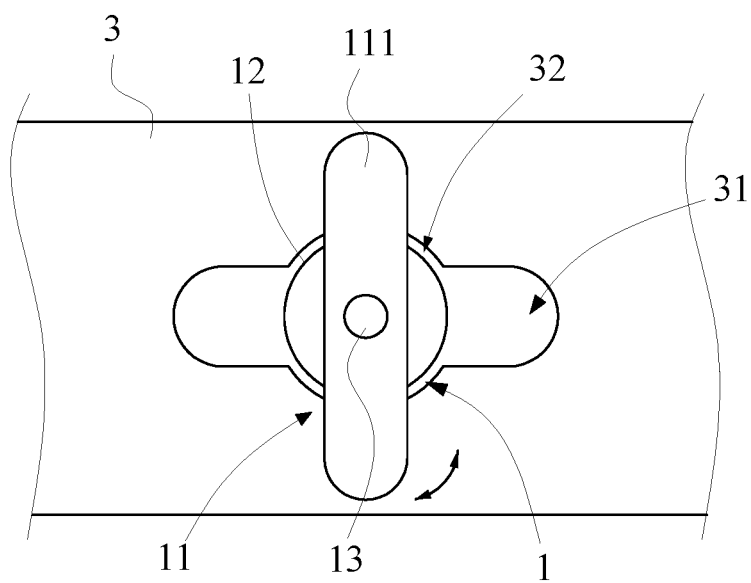
FIG. 3 is a second schematic view of the position-limiting device according to the first embodiment of the present disclosure, showing its operation.
Figure 4:
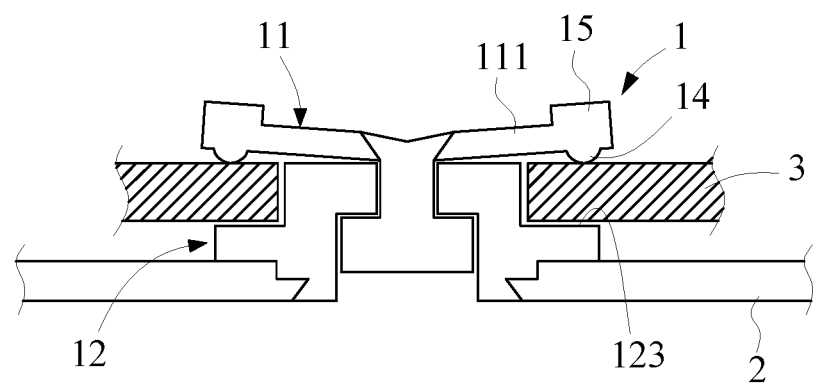
FIG. 4 is a first cross-sectional view of the position-limiting device according to the second embodiment of the present disclosure.
Figure 5:
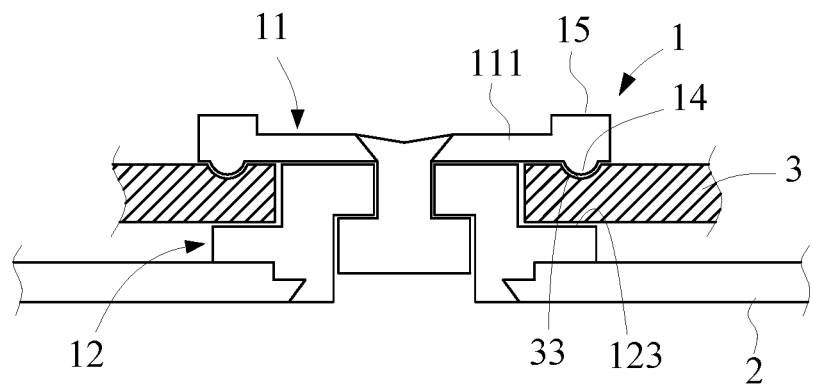
FIG. 5 is a second cross-sectional view of the position-limiting device according to the second embodiment of the present disclosure.
Figure 6:
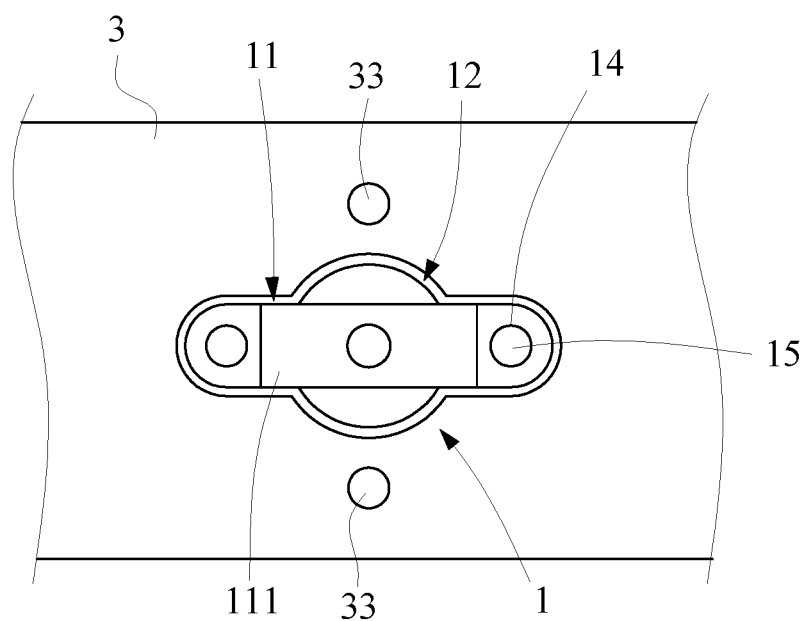
FIG. 6 is a first top view of the position-limiting device according to the second embodiment of the present disclosure.
Figure 7:
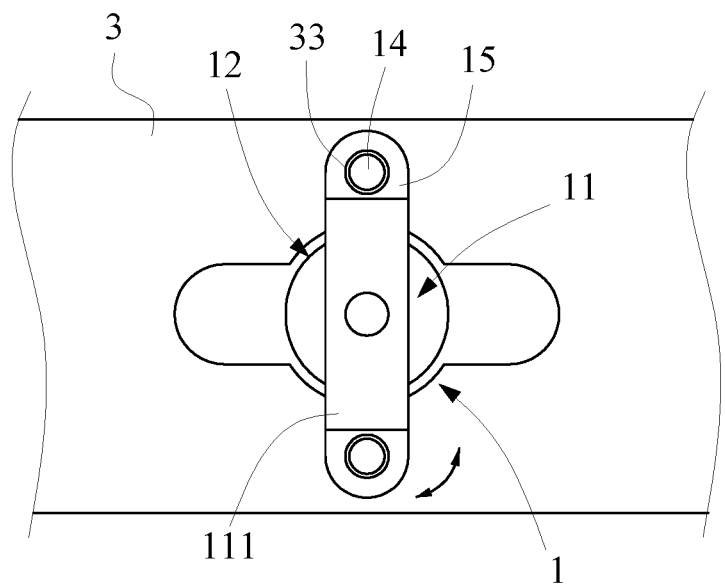
FIG. 7 is a second top view of the position-limiting device according to the second embodiment of the present disclosure.

Referring to FIG. 1 through FIG. 3, the present invention provides a position-limiting device 1. The position-limiting device 1 comprises a position-limiting element 11 and a body 12.

The position-limiting element 11 has a position-limiting portion 111 and a blocking portion 112.

The body 12 has a corresponding blocking portion 121 and a fitting portion 122. The blocking portion 112 of the position-limiting element 11 and the corresponding blocking portion 121 of the body 12 block each other such that the position-limiting element 11 and the body 12 are fitted to each other. The fitting portion 122 is fitted to an object 2. The position-limiting element 11 penetrates a position-limited component 3 before being rotated to block or position-limit the position-limited component 3. The blocking portion 112 and the corresponding blocking portion 121 are fitted together by riveting, fastening, expanding, welding or engaging. The position-limited component 3 further comprises a position-limiting opening portion 31 and a body opening portion 32. The position-limiting element 11 penetrates the position-limiting opening portion 31. The body opening portion 32 position-limits the non-axial or lateral movement of the body 12. The position-limiting portion 111 penetrates the position-limiting opening portion 31 before being rotated to restrict the axial movement of the position-limited component 3. The body opening portion 32 is of a larger size than, of a smaller size than or of the same size as the position-limiting opening portion 31. The position-limiting opening portion 31 is a slot, hole, oblong hole or notch.

To start the operation of the position-limiting device 1, the fitting portion 122 of the body 12 is fitted to the object 2, then both the position-limiting opening portion 31 and the body opening portion 32 of the position-limited component 3 penetrate the position-limiting element 11 and the body 12, respectively, such that the body 12 and the body opening portion 32 come into contact with each other (or abut against each other); hence, the body 12 is subjected to lateral (non-axial) position limitation performed by the body opening portion 32 of the position-limited component 3. Afterward, the position-limiting portion 111 of the position-limiting element 11 is rotated such that the position-limiting portion 111 and the position-limiting opening portion 31 are spaced apart. Upon its rotation, the position-limiting portion 111 generates an opposing force and thereby blocks the surface of the position-limited component 3 so as to block or position-limit the position-limited component 3, thereby coupling the object 2 and the position-limited component 3 together through the position-limiting device 1.

Removal of the position-limited component 3 entails rotating the position-limiting portion 111 of the position-limiting element 11 such that the position-limiting portion 111 separates from the position-limited component 3 and corresponds in position to the position-limiting opening portion 31; at this point in time, the position-limiting opening portion 31 is open, allowing the position-limited component 3 to separate from the position-limiting device 1.

In an embodiment of the present invention, the position-limiting element 11 has a joint portion 13. The joint portion 13 is disposed at the blocking portion 112 and fitted to the position-limiting portion 111. Hence, the position-limiting portion 111 undergoes rotation because of the joint portion 13. The position-limiting element 11 is a strip, block, sheet or lever. Hence, the position-limiting element 11 of the present invention is practical.

Referring to FIG. 4 through FIG. 7, the second embodiment differs from the first embodiment in that the bottom surface of the position-limiting portion 111 of the position-limiting device 1 has at least a restricting portion 14, and the position-limiting element 11 is a resilient leaf spring. The body 12 has a step portion 123. The top surface of the position-limited component 3 has at least a corresponding restricting portion 33.

The position-limited component 3 is position-limited between the step portion 123 and the position-limiting portion 111. The position-limiting portion 111 undergoes rotation and position limitation, the restricting portion 14, which is resilient, generates an opposing force and thereby blocks the surface of the position-limited component 3. As soon as the restricting portion 14 is rotated to reach the corresponding restricting portion 33, the restricting portion 14 moves to engage with the corresponding restricting portion 33. The restricting portion 14 and the corresponding restricting portion 33 correspond in position to each other, interfere with each other or position-limit each other so as to laterally or non-axially block the position-limited component 3. The restricting portion 14 or the corresponding restricting portion 33 is a convex portion, concave portion, slot portion, hole portion, plane portion, engaging portion, arcuate surface portion, curved surface portion or step portion. After the object 2 and the position-limited component 3 have been coupled together through the position-limiting device 1, the restricting portion 14 and the corresponding restricting portion 33 operate in conjunction with each other, allowing the position-limiting portion 111 to attain positioning after rotation.

In this embodiment, the top surface of the position-limiting element 11 has at least a control portion 15. The control portion 15 facilitates manual operation or tool control and thereby facilitates application of an applied force and resultant operation.

Figure 8:
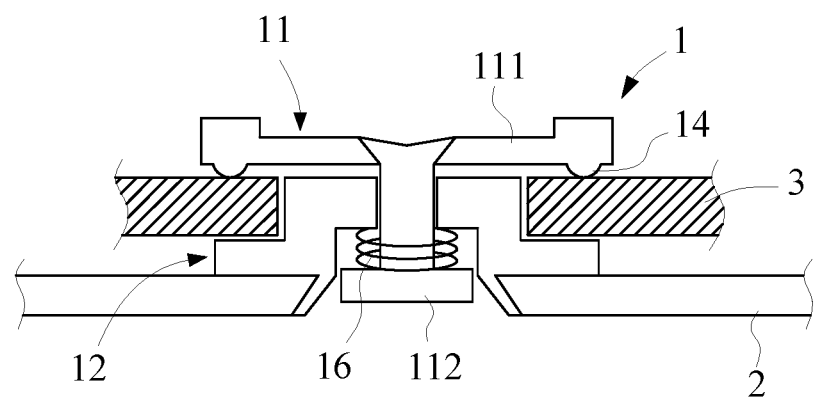
FIG. 8 is a cross-sectional view of the position-limiting device according to the third embodiment of the present disclosure.
Figure 9:
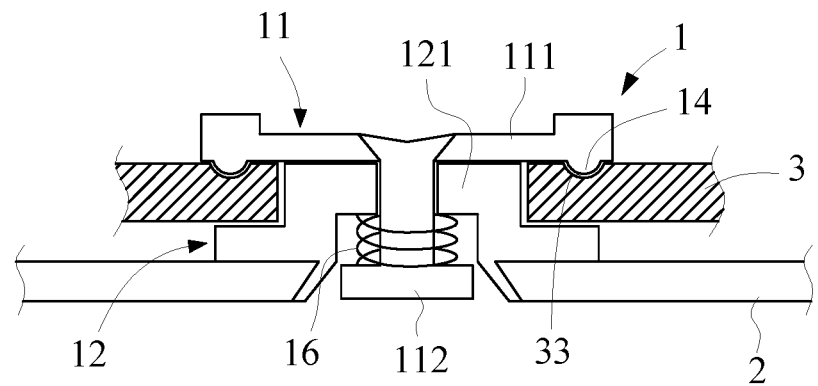
FIG. 9 is a schematic view of the position-limiting device according to the third embodiment of the present disclosure, showing its operation.

Referring to FIG. 8 and FIG. 9, the third embodiment differs from the first embodiment and the second embodiment in that the position-limiting device 1 further comprises a resilient component 16. The two ends of the resilient component 16 abut against the blocking portion 112 of the position-limiting element 11 and the corresponding blocking portion 121 of the body 12, respectively, to provide the position-limiting portion 111 with resilience or a damping force. The resilient component 16 is a spring, helical spring, washer, leaf spring or sheet. After the position-limiting device 1 has coupled together the object 2 and the position-limited component 3 by the resilient component 16, the restricting portion 14 has a tightening and fixing effect when engaged with the corresponding restricting portion 33, and in consequence the position-limiting portion 111 rotates and then gets positioned in place, thereby rendering the position-limiting device 1 practical.

Figure 10:
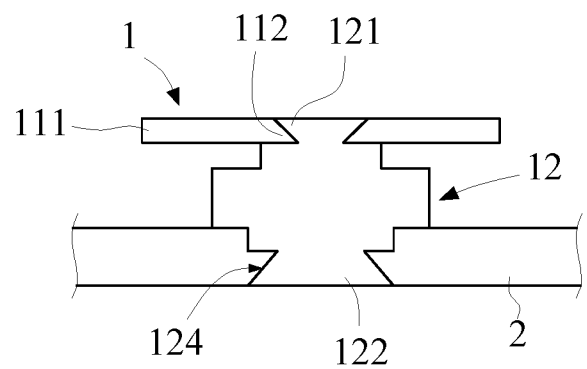
FIG. 10 is a cross-sectional view of the position-limiting device according to the fourth embodiment of the present disclosure.

Referring to FIG. 10, in this embodiment, the fitting portion 122 of the position-limiting device 1 has a material engaging portion 124. Hence, the fitting portion 122 presses against the object 2 such that part of the material of the object 2 enters or flows into the material engaging portion 124, and in consequence the material engaging portion 124 engages with the object 2, thereby coupling together the body 12 and the object 2 firmly.

Figure 11:
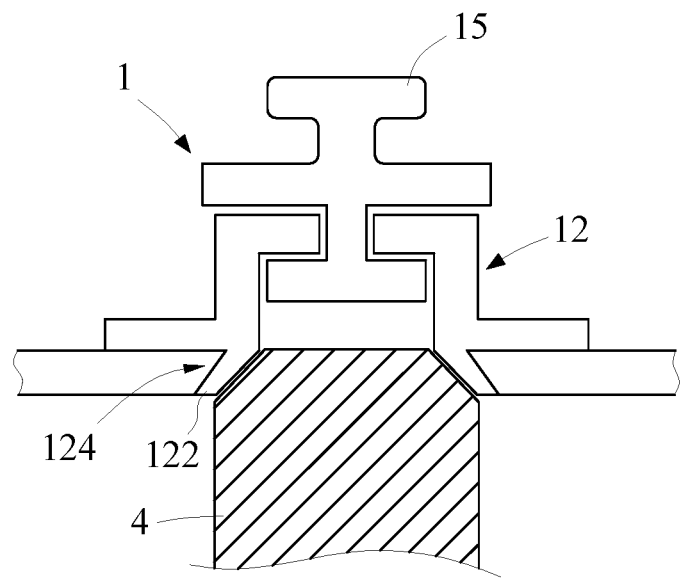
FIG. 11 is a cross-sectional view of the position-limiting device according to the fifth embodiment of the present disclosure.

Referring to FIG. 11, in this embodiment, the fitting portion 122 of the position-limiting device 1 has a material engaging portion 124. Hence, the fitting portion 122 is compressed by a die 4 and thereby deformed to therefore engage with the object, and in consequence the material engaging portion 124 engages with the object 2, thereby coupling together the body 12 and the object 2 firmly.

Figure 12:
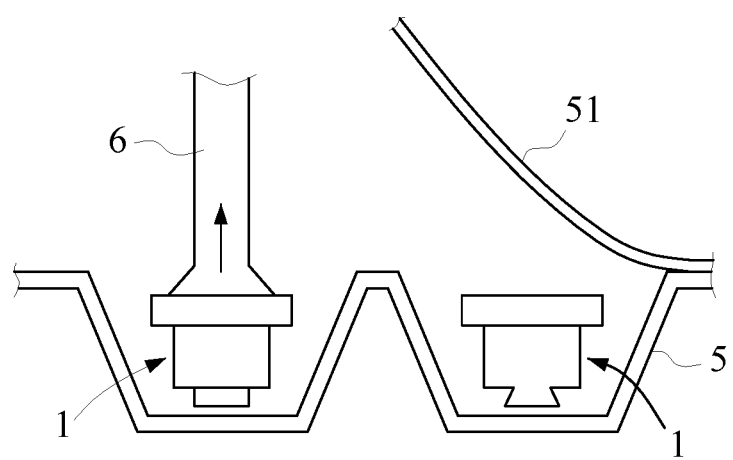
FIG. 12 is a cross-sectional view of the position-limiting device according to the sixth embodiment of the present disclosure.
Figure 13:
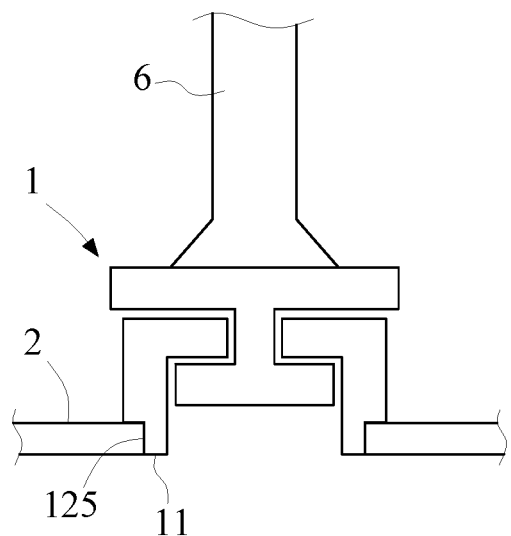
FIG. 13 is a schematic view of the position-limiting device according to the sixth embodiment of the present disclosure, showing its operation.

Referring to FIG. 12 and FIG. 13, in this embodiment, the position-limiting device 1 is disposed in a carrier 5, and the carrier 5 has a cover 51 for closing the position-limiting device 1. The fitting portion 122 has a weldable surface 125. The user takes the position-limiting device 1 out of the carrier 5 with a tool 6 and then puts the position-limiting device 1 at the object 2. The weldable surface 125 of the fitting portion 122 of the position-limiting device 1 and the object 2 are welded together and thereby coupled together. Therefore, the body 12 and the object 2 are fitted together firmly.

Figure 14:
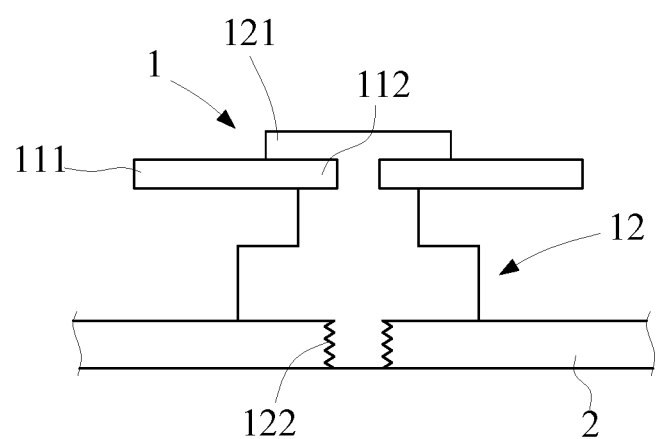
FIG. 14 is a cross-sectional view of the position-limiting device according to the seventh embodiment of the present disclosure.

Referring to FIG. 14, in this embodiment, the fitting portion 122 of the body 12 of the position-limiting device 1 is a screwing portion whereby the fitting portion 122 and the object 2 are fastened together and thereby fitted to each other. The fitting portion 122 of the body 12 and the object 2 may also be fitted to each other by riveting, expanding or engaging (not shown), thereby rendering the position-limiting device 1 practical.

Figure 15:
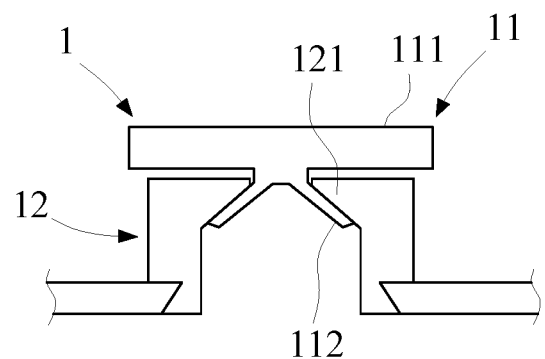
FIG. 15 is a cross-sectional view of the position-limiting device according to the eighth embodiment of the present disclosure.

Referring to FIG. 15, regarding the position-limiting device 1 in this embodiment, the position-limiting portion 111 of the position-limiting portion 11 is integrally formed with the blocking portion 112, whereas the blocking portion 112 and the corresponding blocking portion 121 of the body 12 block each other, thereby allowing the position-limiting portion 111 to rotate relative to the body 12. Therefore, according to the present invention, the position-limiting element 11 is practical.

Figure 16:
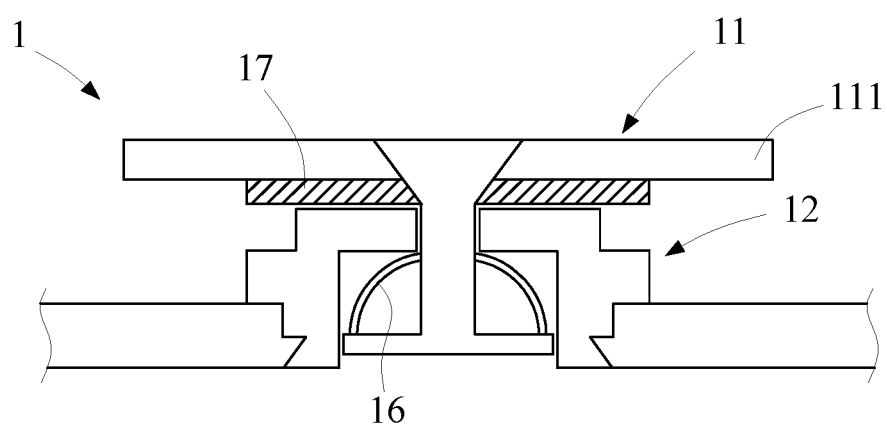
FIG. 16 is a cross-sectional view of the position-limiting device according to the ninth embodiment of the present disclosure.
Figure 17:
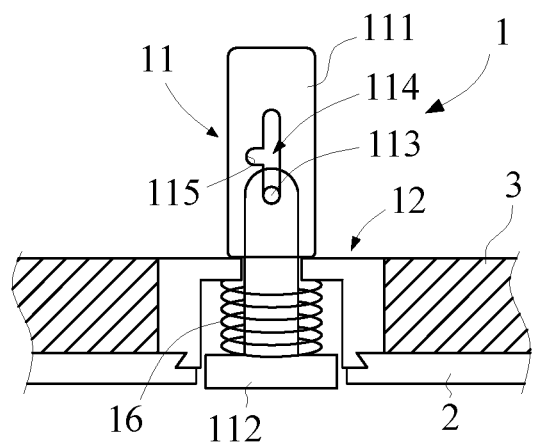
FIG. 17 is a first cross-sectional view of the position-limiting device according to the tenth embodiment of the present disclosure.
Figure 18:
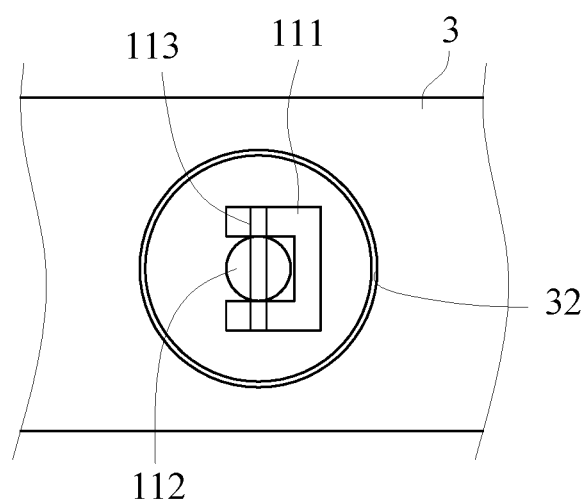
FIG. 18 is a first top view of the position-limiting device according to the tenth embodiment of the present disclosure.
Figure 19:
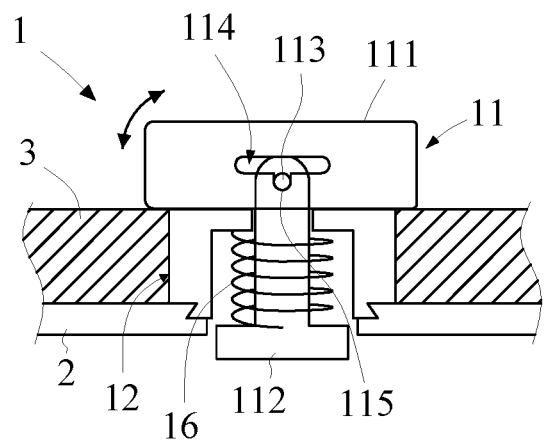
FIG. 19 is a second cross-sectional view of the position-limiting device according to the tenth embodiment of the present disclosure.
Figure 20:
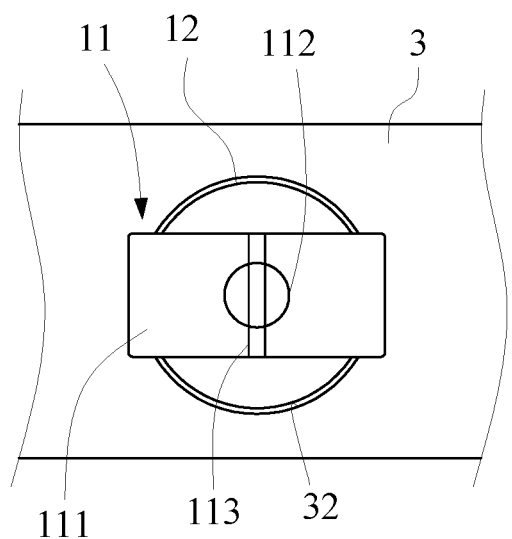
FIG. 20 is a second top view of the position-limiting device according to the tenth embodiment of the present disclosure.

Referring to FIG. 16, the position-limiting device 1 in this embodiment further comprises a resilient component 16 and a friction-enhancing component 17. The two ends of the resilient component 16 abut against the blocking portion 112 of the position-limiting element 11 and the corresponding blocking portion 121 of the body 12, respectively, whereas the friction-enhancing component 17 is disposed between the position-limiting element 11 and the body 12. Therefore, the resilient component 16 and the friction-enhancing component 17 provide the position-limiting element 11 with resilience, a damping force, friction enhancement, an automatic restoring force or an automatic reciprocating bouncing force, and in consequence the position-limiting device 1 is practical. The resilient component 16 and the friction-enhancing component 17 are each a spring, helical spring, washer, leaf spring or sheet.

Referring to FIG. 17 through FIG. 20, regarding the position-limiting device 1 in this embodiment, the position-limiting portion 111 of the position-limiting element 11 and the blocking portion 112 are fitted together by an axle portion 113. The position-limiting portion 111 is a lever. The axle portion 113 penetrates the position-limiting portion 111 and the blocking portion 112 such that the position-limiting portion 111 and the blocking portion 112 are rotated and fitted together. The position-limiting element 11 (or the body 12) has an active portion 114. The active portion 114 enables the position-limiting element 11 (or the body 12) to have a movement space while moving. The position-limiting portion 111 or the blocking portion 112 has a stopping portion 115 for stopping the axle portion 113. The active portion 114 and the stopping portion 115 are each a slot portion, oblong slot portion, hole portion, oblong hole portion, concave portion, convex portion, plane portion, arcuate surface portion, step portion or curved surface portion.

To start using the position-limiting device 1, the user fits the fitting portion 122 of the body 12 of the position-limiting device 1 to the object 2 and passes the body opening portion 32 of the position-limited component 3 through the body 12 such that the body 12 and the body opening portion 32 get closer to each other (or abut against each other), and in consequence the body 12 is laterally (non-axially) position-limited by the body opening portion 32 of the position-limited component 3. Afterward, the user pushes the position-limiting portion 111 of the position-limiting element 11 in the direction of the position-limited component 3 such that the axle portion 113 pulls the blocking portion 112; hence, the blocking portion 112 moves within the active portion 114, whereas the axle portion 113 moves to the stopping portion 115 and causes the resilient component 16 to be in a released state such that the position-limiting portion 111 blocks and position-limits the position-limited component 3, and in consequence the object 2 and the position-limited component 3 are coupled together by the position-limiting device 1.

To remove the position-limited component 3, the user pushes the position-limiting portion 111 of the position-limiting element 11 such that the axle portion 113 pulls the blocking portion 112, and in consequence the axle portion 113 moves away from the stopping portion 115. At this point in time, one end of the position-limiting portion 111 presses against the body 12 such that the resilient component 16 is compressed, and in consequence the position-limiting portion 111 exits the position-limited component 3, allowing the position-limited component 3 to separate from the position-limiting device 1.

Figure 21:
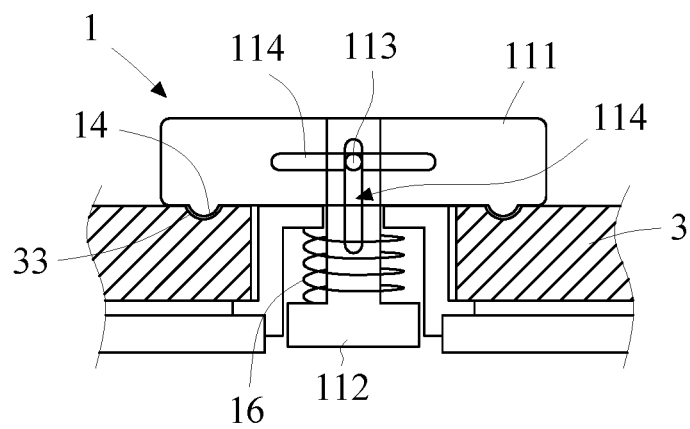
FIG. 21 is a cross-sectional view of the position-limiting device according to the eleventh embodiment of the present disclosure.

Referring to FIG. 21, regarding the position-limiting device 1 in this embodiment, the bottom surface of the position-limiting portion 111 has at least a restricting portion 14, whereas the position-limiting portion 111 and the blocking portion 112 each have an active portion 114. The top surface of the position-limited component 3 has at least a corresponding restricting portion 33. A resilient component 16 fits around the blocking portion 112 such that the two ends of the resilient component 16 abut against the blocking portion 112 and the body 12, respectively.

The restricting portion 14 is rotated; hence, it blocks the surface of the position-limited component 3 or moves to engage with the corresponding restricting portion 33. As a result, the axle portion 113 moves within the active portion 114 to enable the position-limiting portion 111 to undergo rotation and position limitation. In the presence of the resilient component 16, the restricting portion 14 has a tightening and fixing effect when engaged with the corresponding restricting portion 33. Therefore, the position-limiting device 1 is practical.

Figure 22:
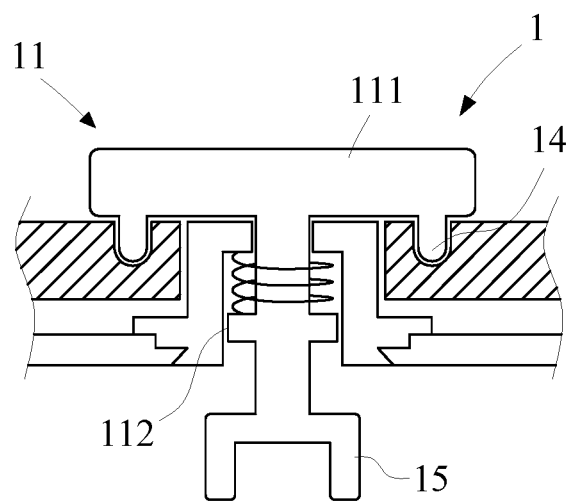
FIG. 22 is a cross-sectional view of the position-limiting device according to the twelfth embodiment of the present disclosure.

Referring to FIG. 22, regarding the position-limiting device 1 in this embodiment, the bottom surface of the position-limiting portion 111 of the position-limiting element 11 has at least a restricting portion 14, whereas the top surface of the position-limited component 3 has at least a corresponding restricting portion 33. The bottom surface of the blocking portion 112 has at least a control portion 15.

The user presses and rotates the control portion 15 and thus moves the position-limiting portion 111 and the restricting portion 14 such that either the restricting portion 14 engages with the corresponding restricting portion 33 or the restricting portion 14 moves away from the corresponding restricting portion 33, and in consequence the object 2 and the position-limited component 3 are coupled together or separated easily because of the control portion 15 conducive to application of an applied force and resultant operation.

Figure 23:
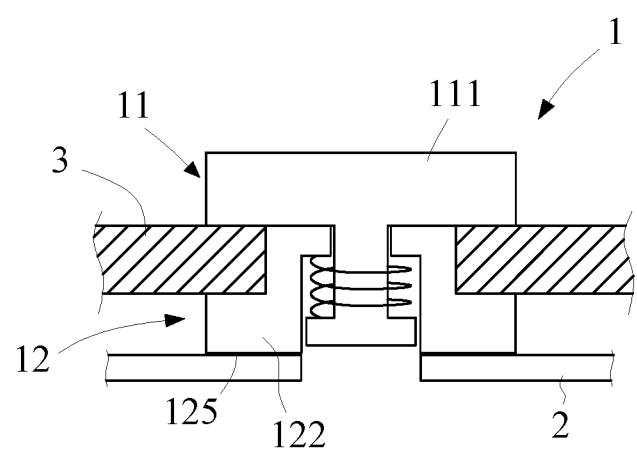
FIG. 23 is a cross-sectional view of the position-limiting device according to the thirteenth embodiment of the present disclosure.

Referring to FIG. 23, regarding the position-limiting device 1 in this embodiment, the weldable surface 125 of the fitting portion 122 of the body 12 and the object 2 are welded together and thereby coupled together. Hence, the body 12 and the object 2 are fitted together firmly. Hence, the position-limiting element 11 rotates relative to the body 12, whereas the position-limiting portion 111 blocks or moves away from the position-limited component 3, and in consequence the object 2 and the position-limited component 3 are coupled together or separated by the position-limiting device 1.

Figure 24:
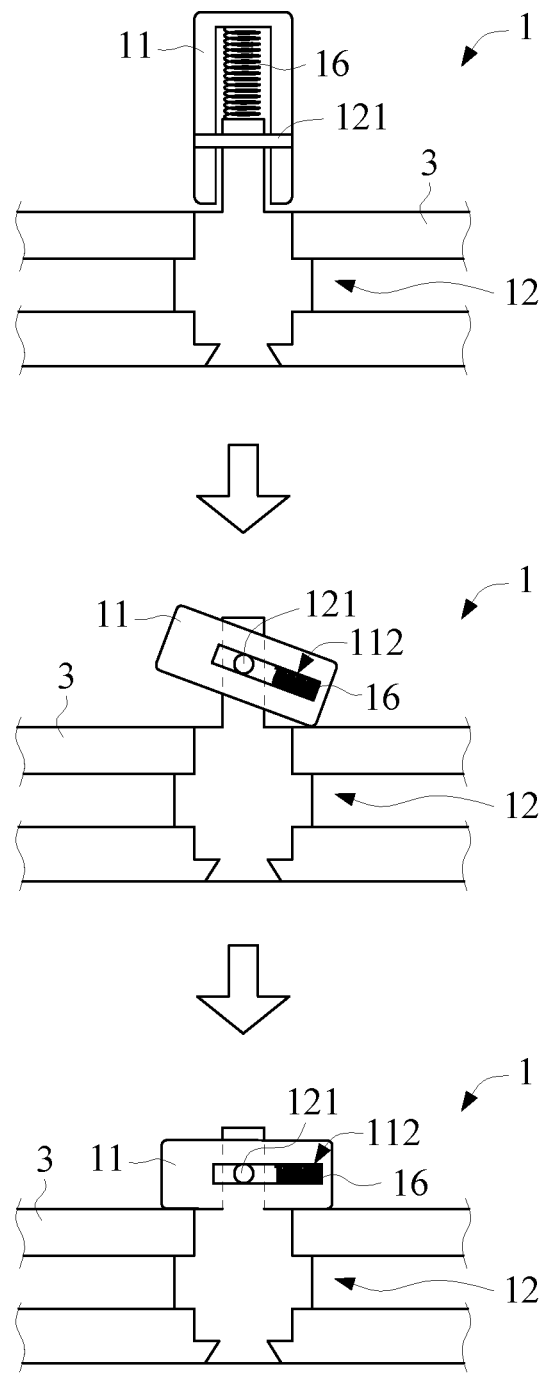
FIG. 24 is a cross-sectional view of the position-limiting device according to the fourteenth embodiment of the present disclosure, showing its operation.
Figure 25:
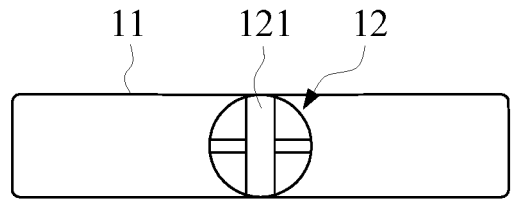
FIG. 25 is a top view of the position-limiting device according to the fourteenth embodiment of the present disclosure.
Figure 26:
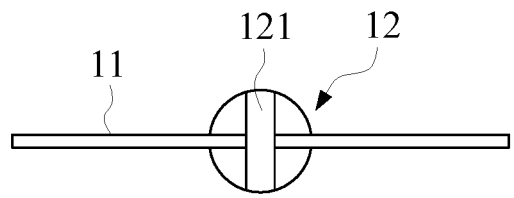
FIG. 26 is a top view of the position-limiting device according to the fifteenth embodiment of the present disclosure.

Referring to FIG. 24 through FIG. 26, regarding the position-limiting device 1 in this embodiment, as shown in FIG. 24 and FIG. 25, the corresponding blocking portion 121 (or the blocking portion 112) is an axle (or fastener, hole portion or slot portion), whereas the blocking portion 112 (or corresponding blocking portion 121) is a hole portion or a slot portion. A resilient component 16 is resiliently, abuttingly disposed between the body 12 and the position-limiting element 11 such that one or two sides of the position-limiting element 11 abut against the position-limited component 3, and in consequence the position-limited component 3 is position-limited by the one or two sides of the position-limiting element 11. Furthermore, the position-limiting element 11 may be provided in a manner defined in the embodiment illustrated by FIG. 26.

Figure 27:
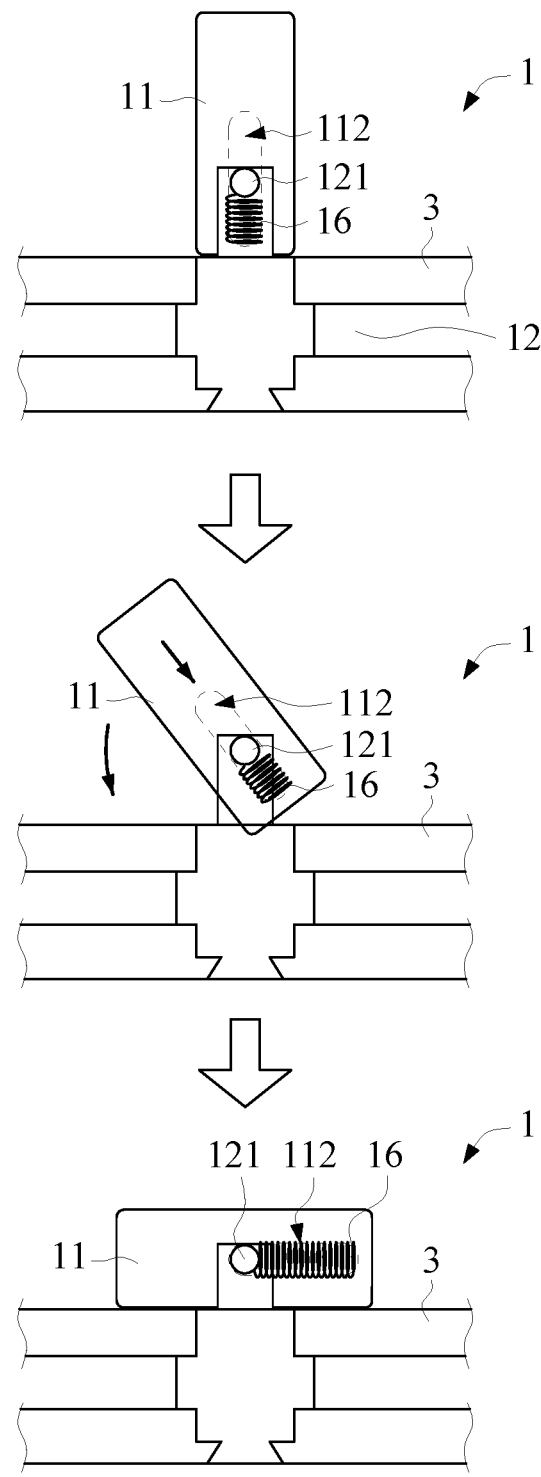
FIG. 27 is a cross-sectional view of the position-limiting device according to the sixteenth embodiment of the present disclosure, showing its operation.

Referring to FIG. 27, regarding the position-limiting device 1 in this embodiment, the corresponding blocking portion 121 (or the blocking portion 112) is an axle (or fastener, hole portion or slot portion), whereas the blocking portion 112 (or corresponding blocking portion 121) is a hole portion or a slot portion. The corresponding blocking portion 121 (or the blocking portion 112), which a resilient component 16 resiliently abuts against, causes one or two sides of the position-limiting element 11 to abut against the position-limited component 3, and in consequence the position-limited component 3 is position-limited by the one or two sides of the position-limiting element 11.

Figure 28:
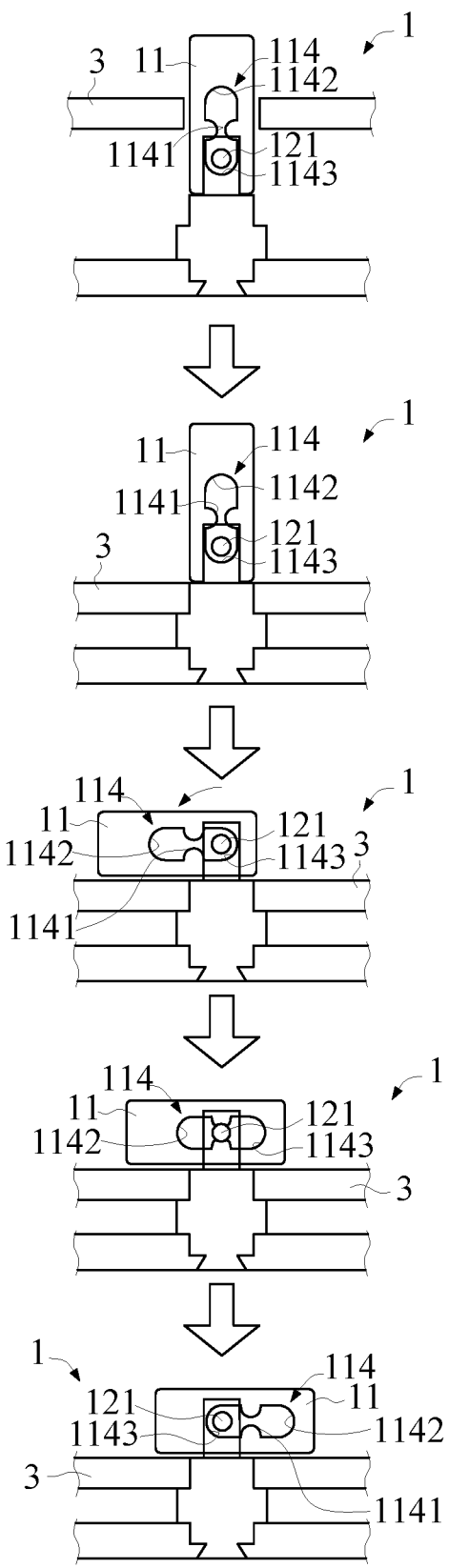
FIG. 28 is a cross-sectional view of the position-limiting device according to the seventeenth embodiment of the present disclosure, showing its operation.

Referring to FIG. 28, regarding the position-limiting device 1 in this embodiment, the active portion 114 has a resilient engaging portion 1141. The resilient engaging portion 1141 resiliently engages with and position-limits the position-limiting element 11 moving. Two sides of the resilient engaging portion 1141 have a first position-limiting region 1142 and a second position-limiting region 1143, respectively, for resiliently engaging with and position-limiting the corresponding blocking portion 121 (or the blocking portion) such that movement thereof is confined to the first position-limiting region 1142 or the second position-limiting region 1143.

After the resilient engaging portion 1141 has resiliently engaged with and moved the first position-limiting region 1142 or the second position-limiting region 1143, the corresponding blocking portion 121 (or the blocking portion) causes one or two sides of the position-limiting element 11 to abut against the position-limited component 3, thereby allowing the position-limited component 3 to be position-limited by the one or two sides of the position-limiting element 11. To disable the position limitation otherwise imposed on the position-limited component 3, the user moves the resilient engaging portion 1141 such that it undergoes resilient engagement, causing the corresponding blocking portion 121 (or blocking portion) to enter the first position-limiting region 1142 or the second position-limiting region 1143. Afterward, the user rotates the position-limiting element 11 to stop the position-limiting element 11 from position-limiting the position-limited component 3, thereby allowing the position-limited component 3 to be taken out.

Figure 29:
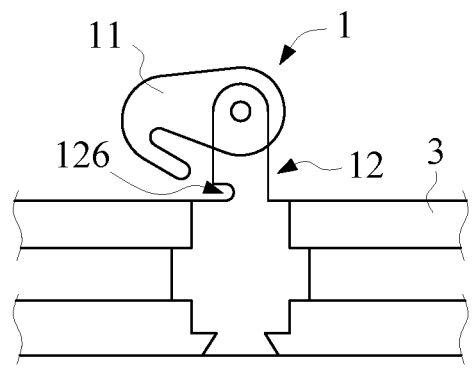
FIG. 29 is a cross-sectional view of the position-limiting device according to the eighteenth embodiment of the present disclosure, showing its operation.
Figure 29:
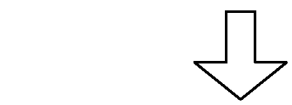
Figure 29:
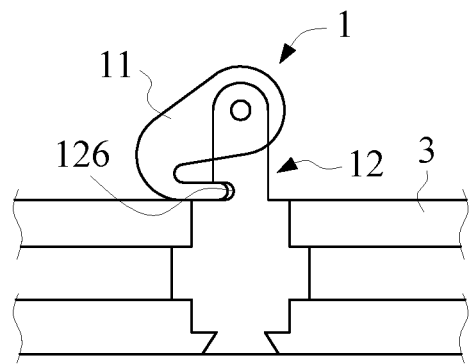

Referring to FIG. 29, regarding the position-limiting device 1 in this embodiment, the body 12 has a self-engaging portion 126, and the position-limiting element 11 can be engaged insertedly with the self-engaging portion 126 to position-limit the position-limited component 3.

Figure 30:
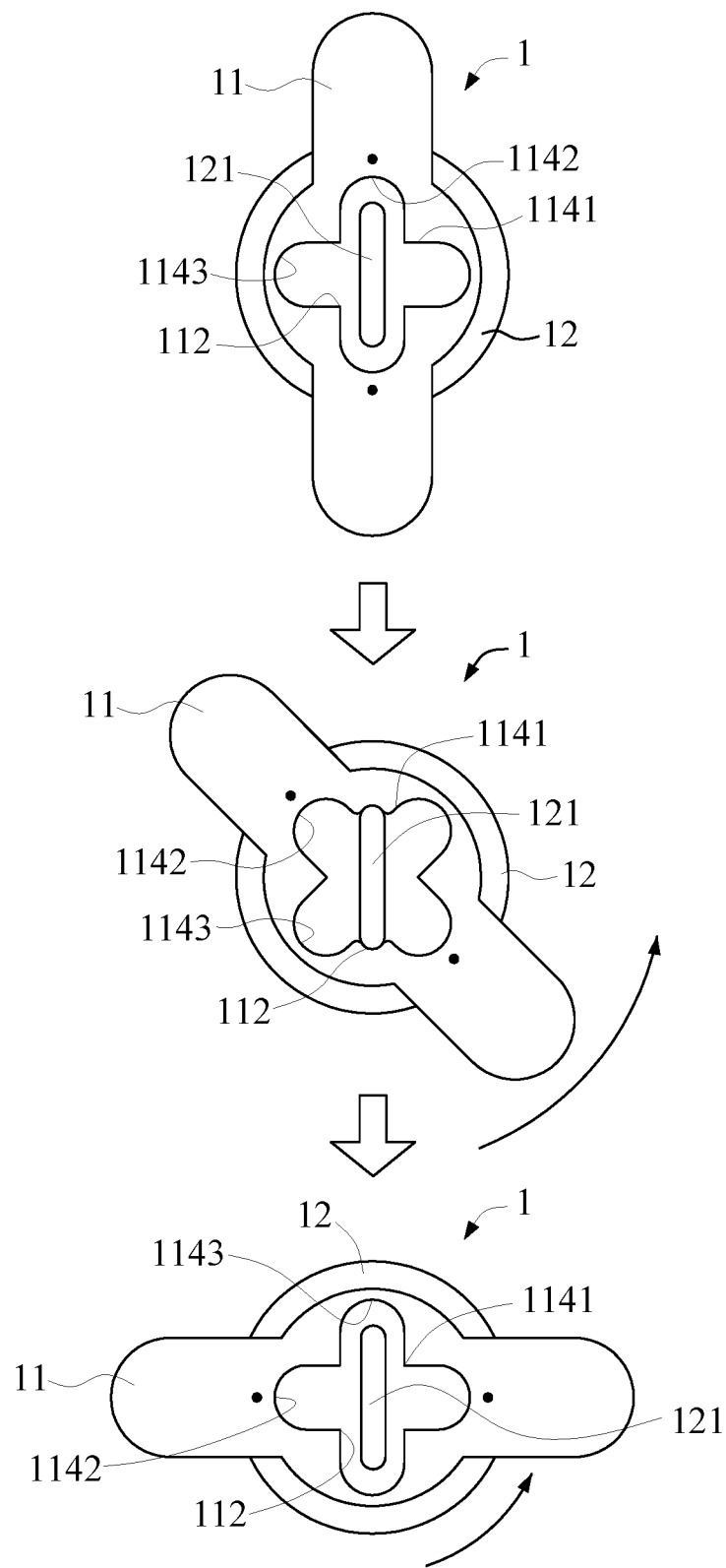
FIG. 30 is a top view of the position-limiting device according to the nineteenth embodiment of the present disclosure.

Referring to FIG. 30, regarding the position-limiting device 1 in this embodiment, the blockade implemented by the blocking portion 112 and the corresponding blocking portion 121 occurs from above, from below or from beside. The user rotates the position-limiting element 11 such that the resilient engaging portion 1141 moves the first position-limiting region 1142 or the second position-limiting region 1143 to allow the blocking portion 112 to resiliently engage with the corresponding blocking portion 121, and in consequence the position-limiting element 11 position-limits or moves away from the position-limited component (not shown).

Figure 31:
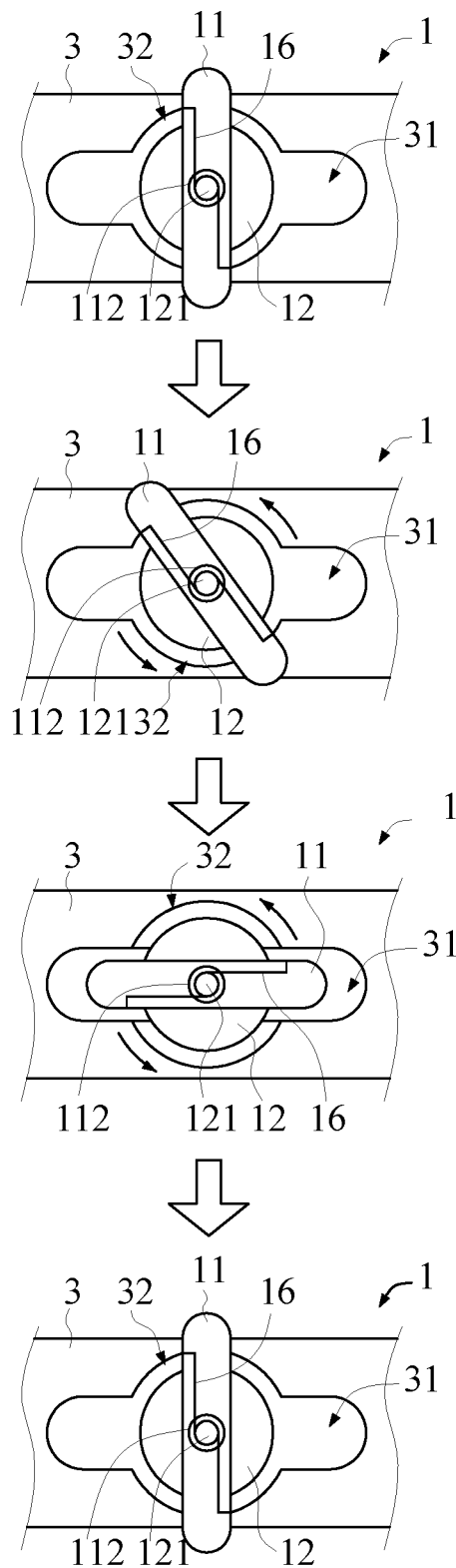
FIG. 31 is a top view of the position-limiting device according to the twentieth embodiment of the present disclosure.

Referring to FIG. 31, regarding the position-limiting device 1 in this embodiment, the corresponding blocking portion 121 has a resilient component 16. The two ends of the resilient component 16 abut against the position-limiting element 11. The blocking portion 112 of the position-limiting element 11 and the corresponding blocking portion 121 of the body 12 block each other.

To start using the position-limiting device 1, the user rotates the position-limiting element 11 such that the position-limiting opening portion 31 and the body opening portion 32 of the position-limited component 3 penetrate the position-limiting element 11 and the body 12 before the user lets go of the position-limiting element 11 to allow the resilient component 16 to automatically rotate and thereby restore the position-limitation state of the position-limiting element 11 and the position-limited component 3. Removal of the position-limited component 3 entails rotating the position-limiting element 11 again such that the position-limiting element 11 separates from the position-limited component 3 and corresponds in position to the position-limiting opening portion 31; at this point in time, the position-limiting opening portion 31 is open, allowing the position-limited component 3 to separate from the position-limiting device 1.

Figure 32:
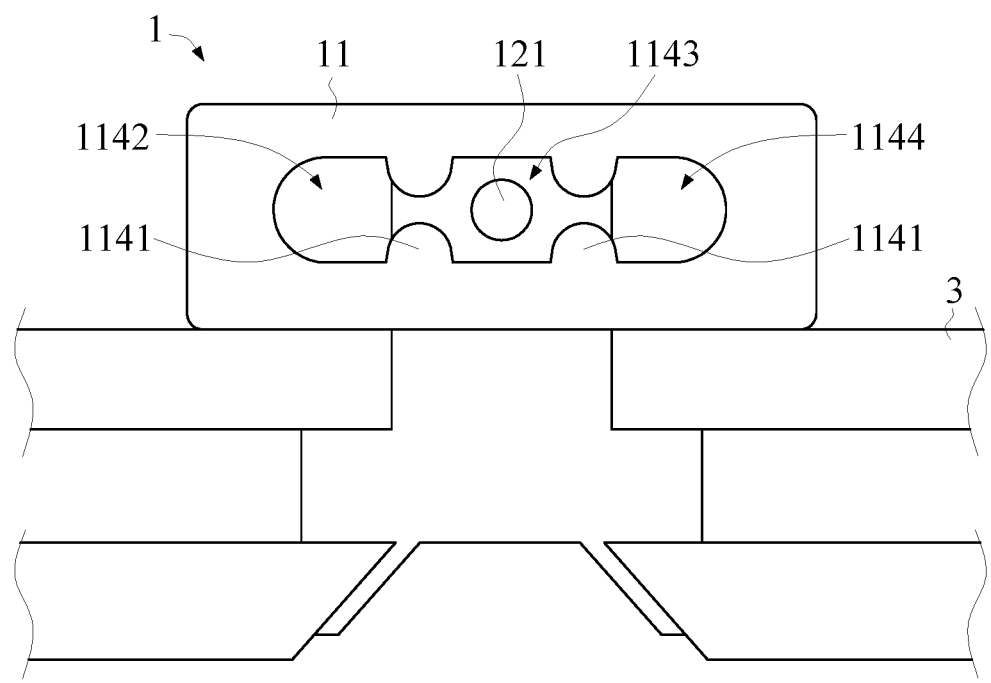
FIG. 32 is a top view of the position-limiting device according to the twenty-first embodiment of the present disclosure.

Referring to FIG. 32, regarding the position-limiting device 1 in this embodiment, the active portion 114 has at least one resilient engaging portion 1141 (two resilient engaging portions 1141 in this embodiment), whereas the resilient engaging portion 1141 resiliently engages with and position-limits the position-limiting element 11 moving. The two sides of the resilient engaging portion 1141 each have a first position-limiting region 1142, a second position-limiting region 1143 and a third position-limiting region 1144 for resiliently engaging with the position-limit corresponding blocking portion 121 and thereby confining movement thereof to the first position-limiting region 1142, the second position-limiting region 1143 or the third position-limiting region 1144.

After the resilient engaging portion 1141 has resiliently engaged with and moved the first position-limiting region 1142, the second position-limiting region 1143 or the third position-limiting region 1144, the corresponding blocking portion 121 causes one or two sides of the position-limiting element 11 to abut against the position-limited component 3 such that the position-limited component 3 is position-limited by one or two sides of the position-limiting element 11. To disable the position limitation otherwise imposed on the position-limited component 3, the user moves the corresponding blocking portion 121 such that it enters the first position-limiting region 1142, the second position-limiting region 1143 or the third position-limiting region 1144 when resiliently engaged with the resilient engaging portion 1141. Afterward, the user rotates the position-limiting element 11 to stop the position-limiting element 11 from position-limiting the position-limited component 3, thereby allowing the position-limited component 3 to be taken out.

While the present disclosure has been described by means of specific embodiments, numerous modifications and variations could be made thereto by those skilled in the art without departing from the scope and spirit of the present disclosure set forth in the claims.

What is claimed is:
1. A position-limiting device, comprising:
   a position-limiting element having a position-limiting portion and a blocking portion; and
   a body having a corresponding blocking portion and a fitting portion, wherein the blocking portion of the position-limiting element and the corresponding blocking portion of the body block each other, allowing the position-limiting element to be fitted to the body, the fitting portion is fitted to an object, and the position-limiting element penetrates a position-limited component and the position limiting portion being rotated to block or position-limit the position-limited component between the position-limiting portion and the body;
   wherein the position-limited component further comprises a position-limiting opening portion and a body opening portion, the body opening portion position-limits non-axial or lateral movement of the body, and the position-limiting portion penetrates the position-limiting opening portion before being rotated to restrict axial movement of the position-limited component.
2. The position-limiting device of claim 1, wherein the body opening portion is of a larger size than, of a smaller size than or of the same size as the position-limiting opening portion.

3. The position-limiting device of claim 1, wherein the position-limiting portion has at least a restricting portion, and the position-limited component has at least a corresponding restricting portion, allowing the restricting portion and the corresponding restricting portion to interfere with each other or position-limit each other when the position-limiting portion undergoes rotation and position limitation.

4. The position-limiting device of claim 3, wherein, when rotated, the restricting portion generates an opposing force and thereby blocks a surface of the position-limited component, whereas, when the position-limiting portion is rotated to reach the corresponding restricting portion, the restricting portion moves to engage with the corresponding restricting portion so as to laterally or non-axially block the position-limited component.

5. The position-limiting device of claim 3, wherein the restricting portion or the corresponding restricting portion is a convex portion, concave portion, slot portion, hole portion, plane portion, engaging portion, arcuate surface portion, curved surface portion or step portion.

6. The position-limiting device of claim 1, wherein the position-limiting element has at least a control portion conducive to manual operation or tool control.

7. The position-limiting device of claim 1, wherein the position-limiting element has a joint portion, and the joint portion is fitted to the position-limiting portion or the blocking portion.

8. The position-limiting device of claim 1, further comprising a resilient component or a friction-enhancing component, the resilient component having two ends abutting against the position-limiting element and the body, respectively, to provide the position-limiting element with resilience, a damping force, friction enhancement, an automatic restoring force or an automatic reciprocating bouncing force.

9. The position-limiting device of claim 8, wherein the resilient component or the friction-enhancing component is a spring, helical spring, washer, leaf spring or sheet.

10. The position-limiting device of claim 1, wherein the fitting portion has a material engaging portion for engaging with the object.

11. The position-limiting device of claim 10, wherein the fitting portion presses against the object such that part of a material of the object enters or flows into the material engaging portion.

12. The position-limiting device of claim 10, wherein the fitting portion is compressed by a die and thereby deformed to therefore engage with the object.

13. The position-limiting device of claim 1, wherein the body has a step portion, and the position-limited component is position-limited between the step portion and the position-limiting portion.

14. The position-limiting device of claim 1, wherein the position-limiting opening portion is a slot, hole, oblong hole or notch.

15. The position-limiting device of claim 1, wherein the position-limiting element is a strip, block, sheet, lever, or resilient leaf spring.

16. A position-limiting device, comprising:
a position-limiting element having a position-limiting portion and a blocking portion; and
a body having a corresponding blocking portion and a fitting portion, wherein the blocking portion of the position-limiting element and the corresponding blocking portion of the body block each other, allowing the position-limiting element to be fitted to the body, the fitting portion is fitted to an object, and the position-limiting element penetrates a position-limited component and the position limiting portion being rotated to block or position-limit the position-limited component between the position-limiting portion and the body;
wherein the blocking portion and the corresponding blocking portion are fitted to each other by riveting, fastening, expanding, welding or engaging.

17. The position-limiting device of claim 16, wherein the position-limited component further comprises a body opening portion, the body opening portion position-limits non-axial or lateral movement of the body, and the position-limiting portion penetrates the body opening portion before being rotated to restrict axial movement of the position-limited component.

* * * * *